L. C. WARNER.
ART OF TREATING RUBBER.
APPLICATION FILED MAR. 17, 1913.

1,122,824.

Patented Dec. 29, 1914.

WITNESSES:
Fred White
Rene Brunel

INVENTOR:
Lewis Carter Warner
By Attorneys,

UNITED STATES PATENT OFFICE.

LEWIS CARTER WARNER, OF NAUGATUCK, CONNECTICUT, ASSIGNOR TO THE BEACON FALLS RUBBER SHOE COMPANY, OF BEACON FALLS, CONNECTICUT, A CORPORATION OF CONNECTICUT.

ART OF TREATING RUBBER.

1,122,824.     Specification of Letters Patent.     Patented Dec. 29, 1914.

Application filed March 17, 1913. Serial No. 754,925.

*To all whom it may concern:*

Be it known that I, LEWIS CARTER WARNER, a citizen of the United States, residing in Naugatuck, in the county of New Haven and State of Connecticut, have invented certain new and useful Improvements in the Art of Treating Rubber, of which the following is a specification.

This invention relates to the cure or vulcanization of gums such as india rubber and articles of manufacture composed in whole or in part of compounds of such gums and other ingredients.

Among the objects of the invention is the production of articles of soft, vulcanized rubber whereof the mass of material composing the articles is compact and free from volatile substances and interstitial spaces.

The improvement is peculiarly adapted to the manufacture of footwear—boots and shoes.

The mass of material making up the composition of the article contains, as is well known, certain matters which will become volatilized during the process of vulcanization. Of these matters some are indigenous or native to the gums, and others are present from incorporation therein during the preparatory treatment. When the phenomena incident to vulcanization proceed to a point at which the gums investing the volatile matters cease to be plastic before the liberation of such matters from the mass, bubble holes and blisters result.

In carrying out this present method prior to that stage in the process of vulcanization at which the gum receives the permanent set, such mass is subjected to treatment for removing a considerable portion of these volatile constituents. The vulcanizing medium, upon entrance into the vulcanizing chamber, finds the articles awaiting it in such condition that the medium is received at its maximum efficiency, and the process starts from a fixed unit. The mass, while purged from such factors, is compacted by the pressure of the surrounding gas, and, while such pressure is maintained the purged and compacted mass is vulcanized. During the heat treatment the pressure will preferably be maintained constant. The vulcanizing medium is some suitable gas, preferably air or an inert gas, such, for instance, as carbon dioxid.

Some suitable apparatus will be employed in practising this invention.

The drawings accompanying this specification illustrate a plant which has been used for commercially carrying on the invention.

Figure 1:
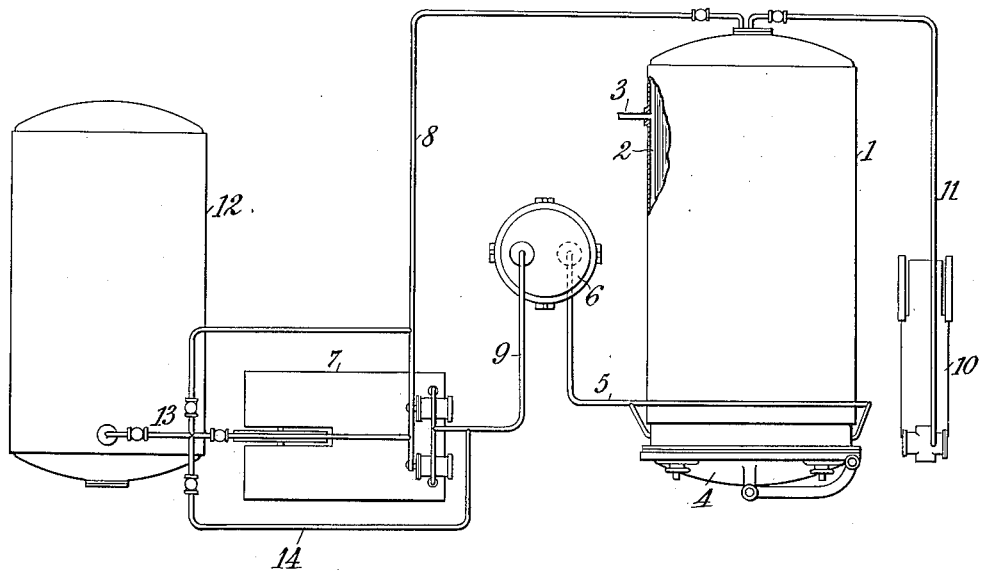
Figure 2:
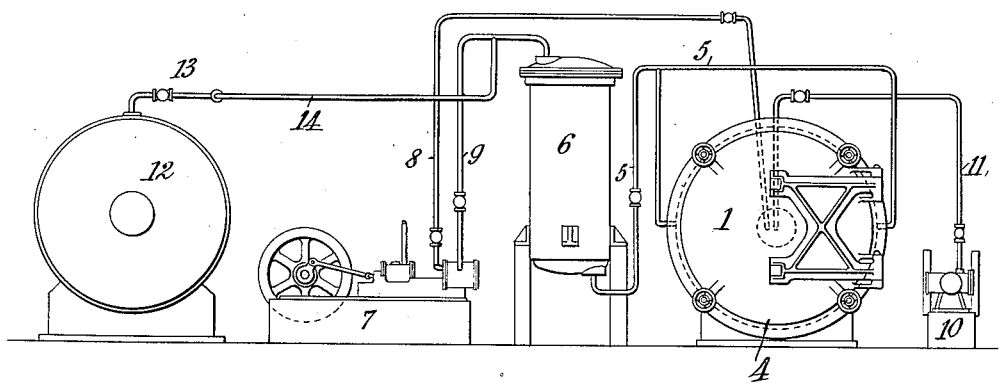

In these drawings Figure 1 is a diagrammatic plan view; and Fig. 2 a diagrammatic elevation.

A vulcanizer 1 is shown, which, in the illustration, comprises a cylindrical device having a steam jacket 2 supplied by steam from some suitable source through a conduit 3. The vulcanizer is provided with a door 4 at one end through which the articles to be treated will be admitted and discharged. The heated gas which, as before stated, may be an inert gas such as carbon dioxid, or may be air, is admitted to the interior of the vulcanizer at one or more suitable points therein, in the present showing by means of a conduit 5 leading from a heater 6. A pump 7 is shown which receives the gas from some suitable point in the vulcanizer through a conduit 8 and forces it into the heater, through a conduit 9, and from the heater thence into the vulcanizer. A vacuum pump is illustrated at 10, which communicates with the interior of the vulcanizer at some suitable point by means of a conduit 11. A receiving tank is illustrated at 12, which is in communication with the vulcanizer by means of a conduit 13 connected with the conduit 8, and is also in communication with the pump 7, by means of the conduit 13. A by-pass conduit 14 around the pump connects the tank 12 with the heater. Of course it is to be understood that pumps capable of automatically maintaining predetermined pressures are preferably employed and that the various pumps and receptacles and apparatus will be efficient for the purposes for which they are intended and will be provided with suitable fittings, cocks and gages.

When it is desired to vulcanize articles by this present improvement and an apparatus substantially as illustrated is provided, the articles will be made of a suitable composition of rubber and other materials which will afford good results with this present treatment and the uses in which the articles are to be employed. Prior to placing the articles in the vulcanizer steam will be admitted to the steam jacket 2 through the inlet 3, which inlet in practice may be connected with some source of steam supply having a constant or uniform pressure. This will raise the temperature of the vulcanizer. The articles will then be placed in the vulcanizer and the door closed. The temperature then will immediately rise within the vulcanizer, which will have a tendency to heat up any gas which is within the mass of the article being treated, and will also heat up those volatile substances which are in the composition of such mass. As soon after the door is closed as conveniently may be, the vacuum pump is started in operation and the interior of the vulcanizer 1 will be reduced to a pressure below the atmospheric pressure, which reduction may be carried to a high point of vacuum in some instances.

The reduction of pressure in the vulcanizer liberates the volatile matters which are within the mass of the composition, and permits the escape of moisture, since it is a well known fact that upon the reduction of pressure and the application of heat, water and other liquids will vaporize, and in this form they readily pass through the mass of material in which they are confined, by traversing minute channels. The gum forming the mass has sufficient natural elasticity and cohesion that upon the mass being purged from these volatile materials the interstices which contained such volatile matters will close up, as will also the passages through which they escaped. After the reduced pressure has been maintained for a short time, which in practice will be a few minutes, about 5 or 10, the vacuum pump will be disconnected from the vulcanizer and the pressure pump 7 started in operation and its connections opened to the vulcanizer, and heated air or gas forced into the vulcanizer at a temperature at first less than the vulcanizing temperature, but at a pressure sufficient to compact the articles which have been purged from their volatile constituents, and cause them to closely adhere to the molds; for instance, if articles of footwear are being vulcanized to cause them to closely adhere to the lasts and to be free from pores and blisters. The pressure pump will be controlled by some automatic means whereby the pressure will be maintained constant at a predetermined amount. It has been found in practice that a pressure of 30 lbs. gives satisfactory results. The temperature within the vulcanizer will be gradually raised to a vulcanizing temperature,—for instance, the temperature at the time of the inauguration of the pressure of 30 lbs. may be 210° F. and be gradually raised through a period enduring for about one hour to 280° F., and then maintained at that temperature for a period enduring for about three-quarters of an hour. At the end of the vulcanizing period the pressure pump may be disconnected and the pressure within the vulcanizer reduced. An escape may be provided to the atmosphere or the gas within the vulcanizer may be permitted to traverse the conduits 8 and 13 into the tank 12. If air is used this tank may be open at the time the air enters; the tank then acting as a muffler. After the pressure has been sufficiently reduced the door 4 will be opened and the articles removed, when it will be found that they are well vulcanized and free from exterior blisters or interior spaces, and that they have been caused to closely adhere to the mold and that the mass of material of which the article is composed is compact and firm.

When a gas is used which it is desired to preserve for re-use it will be exhausted from the vulcanizer into the receiving tank 12 until the pressures within the two tanks are substantially the same, whereupon the pressure pump 7 will be operated to draw the remaining gas from the vulcanizer and into the receiving tank 12, whereby the greater volume of this gas will be preserved and will also be under initial pressure for re-introduction into the vulcanizer when next charged.

The apparatus which is shown and described herein is illustrated and disclosed in greater detail in my copending application, Serial No. 841,213, filed May 27, 1914, and is particularly claimed therein.

It will be understood that the apparatus shown in the drawings is to illustrate the working of the improved method, and that the scope of the invention is not limited to the illustrated example of practising the same.

What I claim is:—

1. That improvement in the art of treating rubber which consists in subjecting the article under treatment to a vacuum for purging the mass of material comprising the same of the volatile, gaseous and liquid components within and upon it, then discontinuing such vacuum, and then subjecting the said article to gas under pressure in excess of atmospheric and at a temperature below vulcanizing temperature for compacting the same, and then, while maintaining the said gas at the said pressure, raising the temperature of the said gas and vulcanizing the mass so purged and compacted.

2. That improvement in the art of treating rubber which consists in subjecting the article under treatment to a reduced pressure and a temperature sufficient to volatilize and dissipate the volatile, gaseous and liquid matter within and upon the mass of said article, thereby facilitating the liberation and escape of the same from within the said mass, then immediately thereafter subjecting the said article to the pressure of gas at a temperature below the vulcanizing temperature for compacting the said mass, and then, while maintaining the said pressure constant, vulcanizing the mass so freed from the said components and compacted.

3. The herein-described method which consists in placing articles to be vulcanized in a heated vulcanizing chamber, closing the chamber, producing a vacuum therein, breaking the vacuum, forcing heated air below the vulcanizing temperature into the chamber, raising the pressure therein, and gradually heating the air to vulcanizing temperature while maintaining the said pressure substantially constant.

4. The herein-described method of vulcanizing rubber articles, which consists in placing the articles upon forms, heating the vulcanizing chamber, placing the articles in the vulcanizing chamber, closing the chamber, materially reducing the pressure within the chamber, thereby drawing off the volatile constituents within the articles, and causing them to adhere to the forms, then raising the pressure within the chamber, and compacting the articles and then while maintaining the said pressure substantially constant heating the interior of the chamber and vulcanizing the articles.

In witness whereof, I have hereunto signed my name in the presence of two subscribing witnesses.

LEWIS CARTER WARNER.

Witnesses:
J. U. FERRIS,
J. T. CROWLEY.